United States Patent [19]

Hansen et al.

[11] E Patent Number: Re. 32,778

[45] Reissued Date of Patent: Nov. 8, 1988

[54] FROTHERS DEMONSTRATING ENHANCED RECOVERY OF COARSE PARTICLES IN FROTH FLOATATION

[75] Inventors: Robert D. Hansen; Richard R. Klimpel; Roger W. Bergman, all of Midland, Mich.

[73] Assignee: The Dow Chemical Company, Midland, Mich.

[21] Appl. No.: 923,523

[22] Filed: Oct. 27, 1986

Related U.S. Patent Documents

Reissue of:

[64] Patent No.: 4,582,596
Issued: Apr. 15, 1986
Appl. No.: 617,284
Filed: Jun. 4, 1984

[51] Int. Cl.[4] ..... B03D 1/14
[52] U.S. Cl. ..... 209/166; 252/61
[58] Field of Search ..... 209/166; 252/61

[56] References Cited

U.S. PATENT DOCUMENTS

| | | | |
|---|---|---|---|
| 2,448,664 | 9/1948 | Fife | 260/615 |
| 2,611,485 | 9/1952 | Tveter | 209/166 |
| 2,695,101 | 11/1954 | Booth et al. | 209/166 |
| 2,695,915 | 11/1954 | Groote | 260/475 |
| 2,782,240 | 2/1957 | Hefner et al. | 568/618 |
| 2,950,818 | 8/1960 | Moeller | 209/166 |
| 3,710,939 | 1/1973 | Hostynek et al. | 209/166 |

FOREIGN PATENT DOCUMENTS

| | | |
|---|---|---|
| 2156243 | 10/1965 | United Kingdom . |
| 2157980 | 11/1985 | United Kingdom . |

*Primary Examiner*—Bernard Nozick

[57] ABSTRACT

The invention is a process for recovering coal or mineral values from raw coal or mineral ore which comprises subjecting the raw coal or mineral ore in the form of an aqueous pulp, to a floatation process in the presence of a floatation collector, and a flotating amount of a floatation frother which comprises the reaction product of an alitphatic $C_6$ alcohol and between about 1 and 5 moles of propylene oxide, butylene oxide or mixtures thereof, under conditions such that the coal or mineral values are recovered.

15 Claims, No Drawings

FROTHERS DEMONSTRATING ENHANCED RECOVERY OF COARSE PARTICLES IN FROTH FLOATATION

Matter enclosed in heavy brackets [ ] appears in the original patent but forms no part of this reissue specification; matter printed in italics indicates the additions made by reissue.

BACKGROUND OF THE INVENTION

This invention relates to novel froth flotation frothers which demonstrate enhanced recovery of coarse particles in froth flotation.

Froth flotation is a commonly employed process for concentrating minerals from ores. In a flotation process, the ore is crushed and wet ground to obtain a pulp. A frothing agent, usually employed with a collecting agent, is added to the ore to assist in separating valuable minerals from the undesired or gangue portions of the ore in subsequent flotation steps. The pulp is then aerated to produce a froth at the surface thereof and the collector assists the frothing agent in separating the mineral values from the ore by causing the mineral values to adhere to the bubbles formed during this aeration step. The adherence of the mineral values is selectively accomplished so that the portion of the ore not containing mineral values does not adhere to the bubbles. The mineral-bearing froth is collected and further processed to obtain the desired minerals. That portion of the ore which is not carried over with the froth, usually identified as "flotation tailings", is usually not further processed for extraction of mineral values therefrom. The froth flotation process is applicable to ores containing metallic and nonmetallic mineral values.

In flotation processes, it is desirable to recover as much mineral values as possible from the ore while effecting the recovery in a selective manner, that is, without carrying over undesirable portions of the ore in the froth.

While a large number of compounds have foam or froth producing properties, the frothers most widely used in commercial froth flotation operations are monohydroxylated compounds such as $C_{5-8}$ alcohols, pine oils, cresols and $C_{1-4}$ alkyl ethers of polypropylene glycols as well as dihydroxylates such as polypropylene glycols. The frothers most widely used in froth flotation operations are compounds containing a nonpolar, water-repellant group and a single, polar, water-avid group such as hydroxyl (OH). Typical of this class of frothers are mixed amyl alcohols, methylisobutyl carbinol, hexyl and heptyl alcohols, cresols, terpineol, etc. Other effective frothers used commercially are the $C_{1-4}$ alkyl ethers of polypropylene glycol, especially the methyl ether and the polypropylene glycols of 140–2100 molecular weight and particularly those in the 200–500 range. In addition, certain alkoxyalkanes, e.g., triethoxybutane, are used as frothers in the flotation of certain ores.

Although mineral recovery improvements from a preferred frother in the treatment of an ore can be as low as only about 1 percent over other frothers, this small improvement is of great importance economically since commercial operations often handle as much as 50,000 tons of ore daily. With the high throughput rates normally encountered in commercial flotation processes, relatively small improvements in the rate of mineral recovery result in the recovery of additional tons of minerals daily. Obviously then, any frother which promotes improved mineral recovery, even though small, is very desirable and can be advantageous in commercial flotation operations.

One well recognized problem in froth flotation is the inability of many commercial froth flotation processes to recover large particles of valuable minerals. Many of the frothers described hereinbefore demonstrate an inability to recover efficiently the coarse particles in a froth flotation process. What are needed are mining chemicals, for instance, frothers, which enhance the recovery of coarse particles while maintaining an efficient recovery for medium sized and fine particles.

SUMMARY OF THE INVENTION

The invention is a process for recovering coal or mineral values from raw coal or mineral ore which comprises subjecting the raw coal or mineral ore in the form of an aqueous pulp, to a flotation process in the presence of a flotation collector, and a flotating amount of a flotation frother which comprises the reaction product of an aliphatic $C_6$ alcohol and between about 1 and 5 moles of propylene oxide, butylene oxide or mixtures thereof, under conditions such that the coal or mineral values are recovered.

The process of this invention is a process in which the recovery of coarse particles of the desired mineral values is surprisingly higher than processes heretofore known. The particular frothers used in this invention enhance the efficiency of the recovery of the coarse particles while maintaining efficient recoveries of medium and fine particle sizes of mineral values.

DETAILED DESCRIPTION OF THE INVENTION

The process of this invention results in an improved and efficient process for the recovery of coal and mineral values with enhanced recovery of the coarse particles of the coal and mineral values. Critical to the enhanced recovery of such coarse particles is the choice of the frother to be used. The frother which gives such enhanced recovery of the coarse particles is the reaction product of a $C_6$ alcohol and between about 1 and 5 moles of propylene oxide, butylene oxide or mixtures thereof.

The $C_6$ alcohol can be any alicyclic straightor branched-chain alcohol. Examples of such alcohols include hexanol, methylisobutyl carbinol (1-(1,3-dimethyl)butanol), 1-methyl pentanol, 2-methyl pentanol, 3-methyl pentanol, 4-methyl pentanol, 1-(1,2-dimethyl)-butanol, 1-(1-ethyl-)butanol, 1-(2-ethyl)butanol, 1-(1-ethyl-2-methyl)propanol, 1-(1,1,2-trimethyl)propanol, 1-(1,2,2-trimethyl)propanol, 1-(1,1-dimethyl)butanol, 1-(2,2-dimethyl)butanol, and 1-(3,3-dimethyl)butanol. Preferred $C_6$ alcohols include methylisobutyl carbinol and hexanol.

The alkylene oxides useful in this invention are propylene oxide, 1,2-butylene oxide, and 2,3-butylene oxide. The frothers of this invention are the reaction product of the hereinbefore described $C_6$ alcohols and between about 1 and 5 moles of the described propylene oxide, butylene oxide, or mixtures thereof. Preferably, the frothers are the reaction product of a $C_6$ alcohol and between about 1 and 3 moles of propylene oxide, butylene oxide, or mixtures thereof. In an even more preferred embodiment, the frothers are the reaction product of a $C_6$ alcohol and about 2 moles of propylene oxide, butylene oxide, or mixtures thereof. The preferred alkylene oxide is propylene oxide.

Preferred frothers of this invention correspond generally to the formula

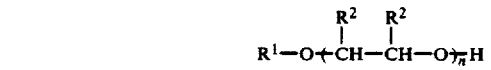

wherein $R^1$ is a straight or branched $C_6$ alkyl radical; $R^2$ is separately in each occurrence hydrogen, methyl, or ethyl; and n is an integer of between about 1 and 5 inclusive; with the proviso that one $R^2$ in each unit must be methyl or ethyl, and with the further proviso that when one $R^2$ in a unit is ethyl, the other $R^2$ must be hydrogen. $R^2$ is preferably hydrogen or methyl. Preferably, n is an integer of between about 1 and 3 inclusive, with about 2 being most preferred. In the embodiment wherein propylene oxide is the alkylene oxide used, in each repeating unit of the hereinbefore described formula, one $R^2$ must be methyl while the other $R^2$ must be hydrogen.

The frothers of this invention can be prepared by contacting the $C_6$ alcohol with the appropriate molar amount of propylene oxide, butylene oxide or mixtures thereof, in the presence of an alkali catalyst such as an alkali metal hydroxide, an amine, or boron trifluoride. Generally, between about 0.5 and 1 percent of the total weight of the reactants of the catalyst can be used. In general, temperatures of up to 150° C. and pressures of up to 100 psi can be used for the reaction. In that embodiment wherein a mixture of propylene and butylene oxide is being used, the propylene and butylene oxide may be added simultaneously or in a sequential manner.

The process of this invention is useful for the recovery by froth flotation of coal and metal values from raw coal and metal ores. Raw coal refers herein to coal in its condition as taken out of the ground, in that the raw coal contains both the valuable coal and what is known in the art as gangue. Gangue refers herein to those materials which are of no value and need to be separated from the coal. A metal ore refers herein to the metal as it is taken out of the ground and includes the metal values in admixture with the gangue. This process can be used to recover metal oxides, metal sulfides and other metal values.

Sulfide ores for which these compounds are useful include copper sulfide-, zinc sulfide-, molybdenum sulfide-, cobalt sulfide-, nickel sulfide-, lead sulfide-, arsenic sulfide-, silver sulfide-, chromium sulfide-, gold sulfide-, platinum sulfide- and uranium sulfide-containing ores. Examples of sulfide ores from which metal sulfides may be concentrated by froth flotation using the process of this invention include copper-bearing ores such as, for example, covellite (CuS), chalcocite ($Cu_2S$), chalcopyrite ($CuFeS_2$), valleriite ($Cu_2Fe_4S_7$ or $Cu_3Fe_4S_7$), bornite ($Cu_5FeS_4$), cubanite ($Cu_2SFe_4S_5$), enargite ($Cu_3(As_1Sb)S_4$), tetrahedrite ($Cu_3SbS_2$), tennantite ($Cu_{12}As_4S_{13}$), brochantite ($Cu_4(OH)_6SO_4$), antlerite ($Cu_3SO_4(OH)_4$), famatinite ($Cu_3(SbAs)S_4$), and bournonite ($PbCuSbS_3$); lead-bearing ores such as, for example, galena (PbS); antimony-bearing ores such as, for example, stibnite ($Sb_2S_3$); zinc-bearing ores such as, for example, sphalerite (ZnS); silver-bearing ores such as, for example, stephanite ($Ag_5SbS_4$), and argentite ($Ag_2S$); chromium-bearing ores such as, for example, daubreelite ($FeSCrS_3$); and platinum- and palladium-bearing ores such as, for example, cooperite ($Pt(AsS)_2$).

Oxide ores for which this process is useful include copper oxide-, aluminum oxide-, iron oxide-, iron titanium oxide-, magnesium aluminum oxide-, iron chromium oxide-, titanium oxide-, manganese oxide-, tin oxide-, and uranium oxide-containing ores. Examples of oxide ores from which metal oxides may be concentrated by froth flotation using the process of this invention include copper-bearing ores, such as cuprite ($Cu_2O$), tenorite (CuO), malachite ($Cu_2(OH)_2CO_3$), azurite ($Cu_3(OH)_2(CO_3)_2$), atacamite ($Cu_2Cl(OH)_3$), chrysocolla ($CuSiO_3$); aluminum-bearing ores, such as corundum; zinc-containing ores, such as zincite (ZnO), and smithsonite ($ZnCO_3$); iron-containing ores, such as hematite and magnetite; chromium-containing ores, such as chromite ($FeOCr_2O_3$); iron- and titanium-containing ores, such as ilmenite; magnesium- and aluminum-containing ores, such as spinel; iron-chromium-containing ores, such as chromite; titanium-containing ores, such as rutile; manganese-containing ores, such as pyrolusite; tin-containing ores, such as cassiterite; and uranium-containing ores, such as uraninite; and uranium-bearing ores such as, for example, pitchblende ($U_2O_5(U_3O_8)$) and gummite ($UO_3nH_2O$). Other metal values for which this process is useful include gold-bearing ores, such as sylvanite ($AuAgTe_2$) and calaverite (AuTe); platinum- and palladium-bearing ores, such as sperrylite ($PtAs_2$); and silver-bearing ores, such as hessite ($AgTe_2$).

In a preferred embodiment of this invention, coal or sulfide-containing ores are recovered. In a more preferred embodiment of this invention, coal, copper sulfide, nickel sulfide, lead sulfide, zinc sulfide or molybdenum sulfide are recovered. In an even more preferred embodiment, coal or copper sulfide values are recovered.

The use of the frothers of this invention results in efficient flotation of large particle sizes of the coal and mineral values to be recovered. For the purposes of this invention, coarse particle size in reference to coal refers to a particle size of 500 microns or greater (+35 mesh). For the purpose of this invention, coarse particle size in reference to metal values means a particle size of 250 microns or greater (60+mesh). Not only do the frothers of this invention efficiently float coarse particle size coal and metal values, but they also efficiently float the medium and fine size coal and metal value particles. The use of the frothers of this invention results in an increase of 2 percent or greater in recovery of the coarse particles over the use of methylisobutyl carbinol or the adduct of propanol and propylene oxide as the frother. Preferably, an increased recovery of 10 percent, and most preferably an increased recovery of 20 percent is achieved.

The amount of the frother used for froth flotation depends upon the type of ore used, the grade of ore, the size of the ore particles and the particular frother used. Generally, that amount which separates the desired coal or metal values from the raw coal or metal ore is suitable. Preferably between about 0.005 and 0.5 lb/ton (0.0025 and 0.25 kg/metric ton) can be used. Most preferably, between about 0.01 and 0.2 lb/ton (0.005 and 0.1 kg/metric ton) are used. The froth flotation process of this invention, usually requires the use of collectors. Any collector well-known in the art, which results in the recovery of the desired coal or metal value is suitable. Further, in the process of this invention it is contemplated that the frothers of this invention can be used in mixtures with other frothers known in the art.

Collectors useful in this invention include any collectors known in the art which give recovery of the desired mineral value. Examples of collectors useful in this invention include alkyl monothiocarbonates, alkyl dithiocarbonates, alkyl trithiocarbonates, dialkyl dithiocarbamates, alkyl thionocarbamates, dialkyl thioureas, monoalkyl dithiophosphates, dialkyl and diaryl dithiophosphates, dialkyl monothiophosphates, thiophosphonyl chlorides, dialkyl and diaryl dithiophosphonates, alkyl mercaptans, xanthogen formates, xanthate esters, mercapto benzothiazoles, fatty acids and salts of fatty acids, alkyl sulfuric acids and salts thereof, alkyl and alkaryl sulfonic acids and salts thereof, alkyl phosphoric acids and salts thereof, alkyl and aryl phosphoric acids and salts thereof, sulfosuccinates, sulfosuccinamates, primary amines, secondary amines, tertiary amines, quaternary ammonium salts, alkyl pyridinium salts, guanidine, and alkyl propylene diamines. Collectors useful in froth flotation of coal such as kerosene, diesel oil, fuel oil and the like may be useed in this invention. Furthermore, blends of such known collectors can be used in this invention also.

In the process of this invention, the frothers described hereinbefore can be used in admixture with other well-known frothers. Examples of such frothers include $C_{5-8}$ alcohols, pine oils, cresols, $C_{1-4}$ alkyl ethers of polypropylene glycols, dihydroxylates of polypropylene glycols, glycols, fatty acids, soaps, alkylaryl sulfonates, and the like. Furthermore, blends of such frothers may also be used. All frothers which are suitable for beneficiation of mineral ores and coal by froth flotation can be used in this invention.

SPECIFIC EMBODIMENTS

The following examples are included for illustration and do not limit the scope of the invention or claims. Unless otherwise indicated, all parts and percentages are by weight.

In the following examples, the performance of the frothing processes described is shown by giving the rate constant of flotation and the amount of recovery at infinite time. These numbers are calculated by using the formula $$\gamma = R_x\left[1 - \frac{1 - e^{-kt}}{kt}\right]$$

wherein: $\gamma$ is the amount of mineral recovered at time t, k is the rate constant for the rate of recovery and $R_\infty$ is the calculated amount of the mineral which would be recovered at infinite time. The amount recovered at various times is determined experimentally and the series of values are substituted into the equation to obtain the $R_\infty$ and k. The above formula is explained in Klimpel "Selection of Chemical Reagents for Flotation", Chapter 45, pp. 907–934, Mineral Processing Plant Design, 2nd Ed., 1980, AIME (Denver), (incorporated herein by reference).

EXAMPLE 1

Froth Flotation of Coal

The frothers of this invention, along with several known frothers are used to float coal using 0.2 lb/ton of frother and 1 lb/ton of the collector Soltrol.

Experimental Procedure:

The major coal tested is a bituminous Pittsburgh Seam coal which is slightly oxidized, which is a good test coal for reagent evaluation and comparisons, as it exhibits very typical (average) coal flotation characteristics. The coal, as received, is passed through a jaw crusher and then screened through a 25 mesh sieve. The coarse portion is passed through a hammer mill. The two streams are combined, blended, and then split successively into 200-g packages, and stored in glass jars. The ash content, determined by ignition loss at 750° C., is 27.5 percent. Two large batches of coal are prepared for testing, and sieve analysis shows 15.5 percent coarser than 35 mesh, 31.0 percent less than 170 mesh, and 19.5 percent finer than 325 mesh.

The flotation cell used is a Galigher Agitair 3 in 1 Cell. The 3000 cc cell is used and is fitted with a single blade mechanized froth removal paddle that revolves at 10 rpm. The pulp level is maintained by means of a constant level device that introduces water as the pulp level falls.

The 200-g sample of coal is conditioned in 2800 cc of deionized water for 6 minutes with the agitator revolving at 900 rpm. The pH is measured at this time, and typically is 5.1. After the 6-minute conditioning period, the collector is added (Soltrol® purified kerosene); after a one-minute conditioning period, the frother is added; after another one-minute conditioning period, the air is started at 9 liters/minute and the paddle is energized. The frother is collected after 3 paddle revolutions (0.3 minute), after 3 additional revolutions (0.6 minute), after 4 more revolutions (1.0 minute) and at 2.0 and 4.0 minutes. The cell walls and the paddle are washed down with small squirts of water. The concentrates and the tail are dried overnight in an air oven, weighed, and then sieved on a 35 mesh and 170 mesh screen. Then ash determinations are run on each of the three sieve cuts. In cases where there are large quantities in a cut, the sample is split with a riffle splitter until a small enough sample is available for an ash determination. The weight versus time is then calculated for the clean coal as well as the ash for each flotation run. The results are contained in Table I. R-4 minutes is the experimentally determined recovery associated with 4 minutes of flotation. The experimental error in R-4 minutes is ±0.015.

In Tables I, II and III, MIBC refers to methyl isobutyl carbinol, MIBC-2PO refers to the reaction product of methyl isobutyl carbinol and two equivalents of propylene oxide, and MIBC-3PO refers to the reaction product of methyl isobutyl carbinol and three equivalents of propylene oxide. DF-200 refers herein to DOWFROTH®200 (Trademark of The Dow Chemical Company) which is a methyl ether of propylene glycol with an average molecular weight of 200. DF-400 refers herein to DOWFROTH®400 (Trademark of the Dow Chemical Company) which is a polypropylene glycol with an average molecular weight of about 400. DF-1012 refers to DOWFROTH®1012 (Trademark of The Dow Chemical Company) which is a methyl ether of polypropylene glycol with an average molecular weight of about 400. IPA-2PO refers to the reaction product of isopropyl alcohol and two equivalents of propylene oxide. TPGME-1PO refers to the reaction product of tripropylene glycol methyl ether and one equivalent of propylene oxide. TEB refers to triethoxybutane. Phenol-4PO refers to the reaction product of phenol and four equivalents of propylene oxide. Heptanol-2PO refers to the reaction product of heptanol and two equivalents of propylene oxide. Pentanol-2PO refers to the reaction product of pentanol and two equivalents of propylene oxide. Cyclohexanol-2PO refers to the reaction product of cyclohexanol and two equivalents of propylene oxide. Hexanol-1PO-1EO is the reaction product of hexanol, one equivalent of propylene oxide and one equivalent of ethylene oxide. MIBC-2PO with MIBC is a blend of MIBC-2PO and MIBC. 2-Ethylhexyl alcohol-2PO and 2-ethylhexyl alcohol-3PO refers to the reaction product of 2-ethylhexyl alcohol and 2 and 3 equivalents of propylene oxide, respectively. Hexanol-2PO refers herein to the reaction product of hexanol and 2 equivalents of propylene oxide.

TABLE I

| | | Total | | −35[2] | | | 35 × 170[3] | | −170[4] | |
|---|---|---|---|---|---|---|---|---|---|---|
| Frother | Portion | K | R | K | R | R— min | K | R | K | R |
| MIBC-2PO | A | 11.3 | 0.80 | 21.4 | 0.38 | 0.373 | 13.3 | 0.81 | 8.3 | 1.00 |
| | B | 6.2 | 0.24 | 21.5 | 0.040 | | 10.0 | 0.22 | 3.9 | 0.41 |
| | C | 1.8 | 3.3 | 1.0 | 9.5 | | 1.3 | 3.7 | 2.1 | 2.4 |
| MIBC-3PO | A | 15.5 | 0.77 | 40.0 | 0.33 | 0.325 | 22.2 | 0.77 | 9.7 | 0.97 |
| (crude) | B | 9.5 | 0.19 | 20.8 | 0.026 | | 17.6 | 0.18 | 5.9 | 0.38 |
| | C | 1.6 | 4.1 | 1.9 | 12.7 | | 1.3 | 4.3 | 1.6 | 2.6 |
| MIBC[1] | A | 20.6 | 0.48 | 35.4 | 0.25 | 0.255 | 40.0 | 0.41 | 10.2 | 0.75 |
| | B | 14.0 | 0.11 | 34.9 | 0.030 | | 29.7 | 0.092 | 9.3 | 0.16 |
| | C | 1.5 | 4.4 | 1.0 | 8.3 | | 2.2 | 4.5 | 1.1 | 4.7 |
| DF-200[1] | A | 8.9 | 0.46 | 12.6 | 0.12 | 0.130 | 16.3 | 0.33 | 6.2 | 0.85 |
| | B | 5.0 | 0.10 | 7.8 | 0.017 | | 9.8 | 0.055 | 3.9 | 0.23 |
| | C | 1.8 | 4.6 | 1.6 | 12.0 | | 1.7 | 6.0 | 1.6 | 3.7 |
| DF-400[1] | A | 11.1 | 0.73 | 22.0 | 0.27 | 0.270 | 14.5 | 0.71 | 7.8 | 0.99 |
| | B | 7.3 | 0.23 | 11.6 | 0.028 | | 13.4 | 0.23 | 4.7 | 0.40 |
| | C | 1.5 | 3.2 | 1.9 | 9.6 | | 1.1 | 3.1 | 1.7 | 2.5 |
| DF-1012[1] | A | 15.6 | 0.74 | 28.8 | 0.28 | 0.274 | 23.0 | 0.74 | 9.9 | 0.97 |
| | B | 8.9 | 0.19 | 20.7 | 0.024 | | 17.8 | 0.17 | 5.5 | 0.38 |
| | C | 1.8 | 3.9 | 2.0 | 11.3 | | 1.3 | 4.4 | 1.8 | 2.6 |
| IPA-2PO[1] | A | 14.2 | 0.71 | 28.2 | 0.25 | 0.254 | 19.7 | 0.68 | 9.6 | 0.99 |
| (crude) | B | 7.3 | 0.21 | 12.0 | 0.026 | | 12.2 | 0.18 | 5.3 | 0.38 |
| | C | 1.9 | 3.4 | 2.4 | 9.6 | | 1.6 | 3.8 | 1.8 | 2.6 |
| TPGME-1PO[1] | A | 10.1 | 0.63 | 17.0 | 0.19 | 0.184 | 14.4 | 0.56 | 7.2 | 0.97 |
| | B | 5.9 | 0.17 | 10.1 | 0.013 | | 12.2 | 0.13 | 4.13 | 0.39 |
| | C | 1.7 | 3.8 | 1.7 | 14.6 | | 1.2 | 4.3 | 1.7 | 2.5 |
| TEB[1] | A | 6.4 | 0.46 | 13.6 | 0.083 | 0.0847 | 10.2 | 0.31 | 4.6 | 0.91 |
| | B | 3.4 | 0.10 | 8.0 | 0.0085 | | 6.1 | 0.053 | 2.7 | 0.27 |
| | C | 1.9 | 4.5 | 1.7 | 9.8 | | 1.7 | 5.8 | 1.7 | 3.4 |
| Cresylic[1] | A | 3.5 | 0.14 | 1.0 | 0.047 | 0.0355 | 1.9 | 0.077 | 4.7 | 0.34 |
| acid | B | 1.0 | 0.081 | 3.6 | 0.014 | | 0.7 | 0.066 | 1.3 | 0.13 |
| | C | 3.5 | 1.7 | 0.3 | 3.4 | | 2.7 | 1.2 | 3.6 | 2.6 |
| Phenol-4PO[1] | A | 9.4 | 0.62 | 17.3 | 0.14 | 0.145 | 12.9 | 0.55 | 6.8 | 0.95 |
| | B | 5.8 | 0.17 | 9.6 | 0.018 | | 10.1 | 0.13 | 4.0 | 0.34 |
| | C | 1.6 | 3.6 | 1.8 | 7.8 | | 1.3 | 4.1 | 1.7 | 2.8 |

A = Clean coal floated
B = Gangue floated
C = Ratio of clean coal to gangue floated
[1]Not an embodiment of the invention
[2]Particles recovered with a size of greater than 35 mesh
[3]Particles recovered with a size of between 35 and 170 mesh
[4]Particles recovered with a size of less than 170 mesh

EXAMPLE 2

Flotation of Coal

A series of froth flotation experiments on coal using the novel frothers of this invention and other known frothers is run using the same procedure as described in Example 1, with the exception that the collector concentration is 2 lb/ton (1.0 kg/metric ton). The results are compiled in Table II. The experimental error in R-4 minutes is ±0.015.

TABLE II

| | | Total | | −35 | | | 35 × 170 | | −170 | |
|---|---|---|---|---|---|---|---|---|---|---|
| Frother | Portion | K | R | K | R | R— min | K | R | K | R |
| MIBC-2PO | A | 8.7 | 0.88 | 10.9 | 0.55 | 0.526 | 9.6 | 0.89 | 7.8 | 1.00 |
| | B | 4.5 | 0.25 | 5.3 | 0.072 | | 7.1 | 0.22 | 3.5 | 0.45 |
| | C | 1.9 | 3.5 | 2.1 | 7.9 | | 1.4 | 4.1 | 2.2 | 2.2 |
| MIBC[1] | A | 5.7 | 0.70 | 12.4 | 0.29 | 0.295 | 14.0 | 0.51 | 5.0 | 0.88 |
| | B | 4.7 | 0.14 | 8.2 | 0.035 | | 8.7 | 0.11 | 3.7 | 0.23 |
| | C | 1.2 | 5.0 | 1.5 | 8.3 | | 1.6 | 4.6 | 1.4 | 3.8 |
| DF-200[1] | A | 7.9 | 0.51 | 15.2 | 0.16 | 0.158 | 13.4 | 0.40 | 5.4 | 0.90 |
| | B | 6.2 | 0.11 | 9.5 | 0.022 | | 12.1 | 0.079 | 4.3 | 0.20 |
| | C | 1.3 | 4.6 | 1.6 | 7.3 | | 1.1 | 5.1 | 1.3 | 4.5 |
| DF-400[1] | A | 10.9 | 0.87 | 19.2 | 0.50 | 0.491 | 13.7 | 0.88 | 8.0 | 1.00 |
| | B | 7.1 | 0.25 | 29.5 | 0.042 | | 11.6 | 0.24 | 4.6 | 0.42 |
| | C | 1.5 | 3.5 | 0.7 | 11.9 | | 1.2 | 3.6 | 1.7 | 2.4 |
| DF-1012[1] | A | 9.3 | 0.86 | 12.6 | 0.41 | 0.392 | 11.0 | 0.90 | 7.4 | 1.00 |
| | B | 5.7 | 0.22 | 11.2 | 0.037 | | 8.4 | 0.20 | 4.0 | 0.43 |
| | C | 1.6 | 3.9 | 1.1 | 11.1 | | 1.3 | 4.6 | 1.8 | 2.3 |
| [Hepta- | A | 6.3 | 0.91 | 10.0 | 0.48 | 0.454 | 6.6 | 0.92 | 5.4 | 1.00 |
| nol-2PO[1] | B | 6.1 | 0.24 | 12.0 | 0.033 | | 7.6 | 0.25 | 4.4 | 0.40 |
| | C | 1.0 | 3.8 | 0.8 | 14.5 | | 0.9 | 3.7 | 1.2 | 2.5 |

TABLE II-continued

| Frother | Portion | Total K | Total R | −35 K | −35 R | −35 R— min | 35 × 170 K | 35 × 170 R | −170 K | −170 R |
|---|---|---|---|---|---|---|---|---|---|---|
| 1-Pentanol-2PO[1] | A | 6.8 | 0.93 | 11.7 | 0.52 | 0.504 | 7.4 | 0.93 | 6.1 | 1.00 |
| | B | 6.0 | 0.28 | 13.9 | 0.038 | | 8.3 | 0.28 | 3.9 | 0.49 |
| | C | 1.1 | 3.3 | 0.8 | 13.7 | | 0.9 | 3.3 | 1.6 | 2.0 |
| Cyclohexanol-2PO[1] | A | 6.0 | 0.56 | 39.2 | 0.31 | 0.306 | 6.9 | 0.85 | 4.6 | 1.00 |
| | B | 5.0 | 0.19 | 4.1 | 0.091 | | 7.6 | 0.17 | 3.3 | 0.32 |
| | C | 1.2 | 4.5 | 9.6 | 3.4 | | 0.9 | 5.0 | 1.4 | 3.1 |
| Hexanol | A | 9.9 | 0.54 | 26.7 | 0.26 | 0.256 | 13.4 | 0.53 | 5.3 | 0.66 |
| | B | 14.6 | 0.097 | 36.5 | 0.029 | | 22.4 | 0.10 | 9.0 | 0.12 |
| | C | 0.7 | 5.6 | 0.7 | 9.0 | | 0.6 | 5.3 | 0.6 | 5.5 |
| Hexanol 1PO-1EO | A | 6.3 | 0.93 | 9.7 | 0.50 | 0.475 | 6.8 | 0.94 | 6.8 | 1.00 |
| | B | 5.2 | 0.23 | 11.4 | 0.027 | | 6.6 | 0.22 | 3.7 | 0.47 |
| | C | 1.2 | 4.0 | 0.9 | 18.5 | | 1.0 | 4.3 | 1.8 | 2.1 |

A = Clean coal floated
B = Gangue floated
C = Clean coal/gangue floated
[1]Not an embodiment of this invention

EXAMPLE 3

A bituminous Pittsburgh Seam coal, non-oxidized is exposed to froth flotation conditions identical to those described in Example 1. The results are compiled in Table III.

TABLE III

| Frother | Portion | Total K | Total R | −35 K | −35 R | −35 R— min | 35 × 170 K | 35 × 170 R | −170 K | −170 R |
|---|---|---|---|---|---|---|---|---|---|---|
| MIBC-2PO (distilled) | A | 6.8 | 1.00 | 6.9 | 0.64 | 0.600 | 7.0 | 1.00 | 5.8 | 1.00 |
| | B | 4.7 | 0.30 | 7.2 | 0.049 | | 5.9 | 0.29 | 3.3 | 0.51 |
| | C | 1.4 | 3.3 | 1.0 | 13.1 | | 1.2 | 3.4 | 4.8 | 2.0 |
| Hexanol-2PO | A | 7.9 | 0.94 | 11.7 | 0.60 | 0.588 | 8.6 | 0.94 | 6.8 | 1.00 |
| | B | 7.4 | 0.26 | 11.0 | 0.054 | | 8.2 | 0.27 | 4.1 | 0.45 |
| | C | 1.1 | 3.6 | 1.1 | 11.1 | | 1.0 | 3.5 | 1.7 | 2.2 |
| MIBC-2PO with MIBC | A | 4.5 | 0.93 | 6.4 | 0.47 | 0.433 | 4.2 | 0.93 | 5.4 | 1.00 |
| | B | 4.2 | 0.25 | 6.9 | 0.031 | | 5.3 | 0.24 | 3.0 | 0.46 |
| | C | 1.1 | 3.7 | 0.9 | 15.2 | | 0.8 | 3.9 | 1.8 | 2.2 |
| MIBC-2PO (crude) | A | 6.5 | 1.00 | 6.9 | 0.55 | 0.510 | 6.8 | 1.00 | 5.9 | 1.00 |
| | B | 4.6 | 0.28 | 7.7 | 0.042 | | 5.7 | 0.27 | 3.3 | 0.47 |
| | C | 1.4 | 3.6 | 0.9 | 13.1 | | 1.2 | 3.7 | 1.8 | 2.1 |
| Isopropanol-2.7PO[1,2] | A | 7.5 | 0.92 | 10.1 | 0.53 | 0.509 | 8.3 | 0.91 | 6.9 | 1.00 |
| | B | 4.6 | 0.27 | 3.6 | 0.054 | | 6.6 | 0.25 | 3.1 | 0.47 |
| | C | 1.6 | 3.4 | 2.8 | 9.8 | | 1.3 | 3.6 | 2.2 | 2.1 |
| Heptanol-2PO[1] | A | 6.3 | 0.91 | 10.0 | 0.48 | 0.454 | 6.6 | 0.92 | 5.4 | 1.00 |
| | B | 6.1 | 0.24 | 12.0 | 0.033 | | 7.6 | 0.25 | 4.4 | 0.40 |
| | C | 1.0 | 3.8 | 0.8 | 14.5 | | 0.9 | 3.7 | 1.2 | 2.5 |
| 1-Pentanol-2PO[1] | A | 6.8 | 0.93 | 11.7 | 0.52 | 0.504 | 7.4 | 0.93 | 6.1 | 1.00 |
| | B | 6.0 | 0.28 | 13.9 | 0.038 | | 8.3 | 0.28 | 3.9 | 0.49 |
| | C | 1.1 | 3.3 | 0.8 | 13.7 | | 0.9 | 3.3 | 1.6 | 2.0 |
| Cyclohexanol-2PO[1] | A | 6.0 | 0.86 | 39.2 | 0.31 | 0.306 | 6.9 | 0.85 | 4.6 | 1.00 |
| | B | 5.0 | 0.19 | 4.1 | 0.091 | | 7.6 | 0.17 | 3.3 | 0.32 |
| | C | 1.2 | 4.5 | 9.6 | 3.4 | | 0.9 | 5.0 | 1.4 | 3.1 |
| *Hexanol* | *A* | *9.9* | *0.54* | *26.7* | *0.26* | *0.256* | *13.4* | *0.53* | *5.3* | *0.66* |
| | *B* | *14.6* | *0.097* | *36.5* | *0.029* | | *22.4* | *0.10* | *9.0* | *0.12* |
| | *C* | *0.7* | *5.6* | *0.7* | *9.0* | | *0.6* | *5.3* | *0.6* | *5.5* |
| *Hexanol-1PO-1EO* | *A* | *6.3* | *0.93* | *9.7* | *0.50* | *0.475* | *6.8* | *0.94* | *6.8* | *1.00* |
| | *B* | *5.2* | *0.23* | *11.4* | *0.027* | | *6.6* | *0.22* | *3.7* | *0.47* |
| | *C* | *1.2* | *4.0* | *0.9* | *18.5* | | *1.0* | *4.1* | *1.8* | *2.1* |
| MIBC[1] | A | 7.3 | 0.61 | 22.4 | 0.23 | 0.232 | 8.9 | 0.58 | 4.5 | 0.77 |
| | B | 11.8 | 0.12 | 37.9 | 0.031 | | 15.8 | 0.10 | 5.7 | 0.17 |
| | C | 0.6 | 5.1 | 0.6 | 9.0 | | 0.6 | 5.3 | 0.8 | 4.5 |
| DF-200[1] | A | 6.3 | 0.78 | 12.0 | 0.38 | 0.368 | 7.4 | 0.75 | 4.6 | 0.95 |
| | B | 6.5 | 0.15 | 14.8 | 0.033 | | 9.4 | 0.14 | 4.1 | 0.26 |
| | C | 1.0 | 5.2 | 0.3 | 11.5 | | 0.3 | 5.4 | 1.1 | 3.7 |
| DF-400[1] | A | 6.3 | 0.94 | 9.6 | 0.55 | 0.518 | 6.7 | 0.95 | 5.9 | 1.00 |
| | B | 5.5 | 0.27 | 11.1 | 0.036 | | 7.5 | 0.27 | 3.5 | 0.46 |
| | C | 1.1 | 3.5 | 0.9 | 15.3 | | 0.9 | 3.5 | 1.7 | 2.2 |
| 2-ethylhexyl alcohol-2PO[1] | A | 6.3 | 0.90 | 10.0 | 0.48 | 0.453 | 6.7 | 0.92 | 5.4 | 1.00 |
| | B | 6.2 | 0.23 | 11.5 | 0.036 | | 7.9 | 0.23 | 4.3 | 0.38 |
| | C | 1.0 | 3.9 | 0.9 | 13.3 | | 0.8 | 4.0 | 1.3 | 2.6 |
| 2-ethylhexyl alcohol-3PO[1] | A | 5.5 | 0.90 | 8.8 | 0.45 | 0.424 | 6.0 | 0.91 | 4.6 | 1.00 |
| | B | 4.5 | 0.21 | 8.7 | 0.031 | | 5.3 | 0.21 | 3.4 | 0.37 |
| | C | 1.2 | 4.3 | 1.0 | 14.5 | | 1.1 | 4.3 | 1.4 | 2.7 |

A = Clean coal floated
B = Gangue floated
[1]Not an embodiment of this invention
[2]Isopropanol 2.7PO. Has the composition of 1 IPA with an average of 2.7 propylene units per molecule with no molecules with 1 propylene oxide unit present.

EXAMPLE 4

Flotation of Copper Sulfide

In this example three frothers are tested for flotation of copper sulfide values. A 500-g quantity of copper ore, chalcopyrite copper sulfide ore, previously packaged is placed in a rod mill with 257 g of deionized water. A quantity of lime is also added to the rod mill, based on the desired pH for the subsequent flotation. The rod mill is then rotated at 60 rpm for a total of 360 revolutions. The ground slurry is transferred to a 1500 ml cell of an Agitair Flotation machine. The float cell is agitated at 1150 rpm and the pH is adjusted to the desired pH (10.5) by the addition of further lime, if necessary.

The collector, potassium amyl xanthate, is added to the float cell (0.004 kg/metric ton), followed by a conditioning time of one minute, at which time the frother is added (0.058 kg/metric ton). After an additional one minute conditioning time, the air to the float cell is turned on at a rate of 4.5 liters per minute and the automatic froth removal paddle is started. Timed cuts of the froth were taken at intervals of 0.5, 1.5, 3.0, 5.0 and 8.0 minutes. The froth samples are dried overnight in an oven, along with the flotation tailings. The dried samples are weighed, divided into suitable samples for analysis, pulverized to insure suitable fineness, and dissolved in acid for analysis. The samples are analyzed using a DC Plasma Spectrograph. The weights of recovered froth and tailings samples and the analyses are used in a computer program to calculate metal and gangue recovery, and the R and K parameters. The results are compiled in Table IV.

TABLE IV

| | +60 mesh | | −60 mesh | | Combined | |
|---|---|---|---|---|---|---|
| Frother | K | R | K | R | K | R |
| MIBC-2PO | 9.3 | 0.198 | 26.4 | 0.706 | 18.4 | 0.904 |
| DF-1012[1] | 17.9 | 0.110 | 32.2 | 0.692 | 28.5 | 0.802 |
| DF-200[1] | 6.31 | 0.158 | 16.9 | 0.694 | 12.8 | 0.852 |

DF = Dowfroth
[1]Not an embodiment of this invention

What is claimed is:

1. A process for recovering coal or metal values from raw coal or metal ore which comprises subjecting the raw coal or metal ore in the form of an aqueous pulp, to a flotation process in the presence of a flotation collector for coal or metal values and a flotating amount of a flotation frother which comprises the reaction product of a monohydroxy aliphatic $C_6$ alcohol and between about 1 and 5 moles of propylene oxide, butylene oxide or mixtures thereof, under conditions such that the coal or metal values are recovered in the froth.

2. The process of claim 1 wherein coal, metal oxide or metal sulfide values are recovered.

3. The process of claim 1 wherein coal, copper sulfide, nickel sulfide, lead sulfide, zinc sulfide or molybdenum sulfide values are recovered.

4. The process of claim 1 wherein coal or metal sulfide values are recovered.

5. The process of claim 4 wherein the frother corresponds to the formula $$R^1-O\left(\overset{R^2}{\overset{|}{C}}H-\overset{R^2}{\overset{|}{C}}H-O\right)_n H$$

wherein $R^1$ is a straight- or branched-chain $C_6$ alkyl radical;

$R^2$ is separately in each occurrence hydrogen, methyl or ethyl; and n is an integer of 1 to 5, inclusive;

with the proviso that one $R^2$ in each unit must be methyl or ethyl, and with the further proviso that when one $R^2$ in a unit is ethyl, the other $R^2$ must be hydrogen.

6. The process of claim 5 wherein n is an integer of 1 to 3, inclusive.

7. The process of claim 6 wherein n is the integer 2.

8. The process of claim 5 wherein the frother is a reaction product of a $C_6$ alcohol and propylene oxide.

9. The process of claim 8 wherein the $C_6$ alcohol is hexanol or methylisobutyl carbinol.

10. The process of claim 9 wherein n is the integer 2.

11. The process of claim 9 wherein a flotating amount of frother is between about 0.005 and 0.5 lb/ton.

12. The process of claim 11 wherein a flotating amount of frother is between about 0.01 and 0.2 lb/ton.

13. The process of claim 5 wherein coal values are recovered.

14. The process of claim 13 wherein the $C_6$ alcohol is hexanol or methylisobutyl carbinol.

15. The process of claim 14 wherein n is 2.

* * * * *